United States Patent [19]
Duffy, Jr.

[11] Patent Number: 5,393,185
[45] Date of Patent: Feb. 28, 1995

[54] PUSH-IN FASTENER HAVING FINS WITH WORK-PIECE ENGAGEMENT RIBS

[75] Inventor: William J. Duffy, Jr., Midlothian, Ill.

[73] Assignee: Illinois Tool Works Inc., Glenview, Ill.

[21] Appl. No.: 130,182

[22] Filed: Oct. 1, 1993

[51] Int. Cl.6 ............................................. F16B 19/00
[52] U.S. Cl. .................................. 411/510; 411/908; 411/913
[58] Field of Search ................ 411/510, 509, 508, 913, 411/908, 907, 447; 24/453, 297

[56] References Cited

U.S. PATENT DOCUMENTS

| | | | |
|---|---|---|---|
| 2,424,757 | 7/1947 | Klumpp, Jr. | 174/153 |
| 3,341,228 | 9/1967 | Miller | 411/913 X |
| 3,483,787 | 12/1969 | Saunders | 411/510 |
| 3,659,320 | 5/1972 | Meyer | 24/73 HS |
| 3,745,612 | 7/1973 | Seckerson | 24/73 PF |
| 3,776,092 | 12/1973 | Seckerson | 85/5 R |
| 4,489,465 | 12/1984 | Lemkin | 24/289 |
| 4,571,134 | 2/1986 | Beglinger et al. | 411/41 |
| 4,579,493 | 4/1986 | Schaty | 411/510 |
| 4,728,238 | 3/1988 | Chisholm et al. | 411/510 |
| 4,782,564 | 11/1988 | Sloan | 24/704.1 |
| 5,005,265 | 4/1991 | Muller | 24/453 |
| 5,039,267 | 8/1991 | Wollar | 411/508 |
| 5,046,223 | 9/1991 | Kraus | 24/453 |
| 5,150,865 | 9/1992 | Miller | 248/71 |

FOREIGN PATENT DOCUMENTS

| | | | |
|---|---|---|---|
| 2589204 | 4/1987 | France | 411/412 |

Primary Examiner—Rodney M. Lindsey
Attorney, Agent, or Firm—Schwartz & Weinrieb

[57] ABSTRACT

A push-in fastener including a head and a shank, the shank including at least one resilient fin integrally formed along its length for insertion and retention of the fastener within an aperture of an article where the fin includes at least one engagement rib formed on either side thereof for contact with the edges of the aperture and for absorbing any wear or shear caused by the edges upon insertion or removal of the fastener so the fin remains intact and maintains the originally designed insertion and retention forces.

11 Claims, 1 Drawing Sheet

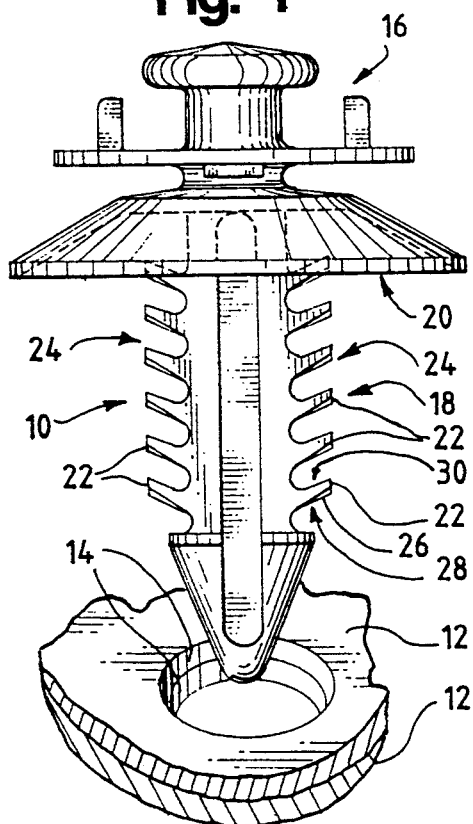
Fig. 1
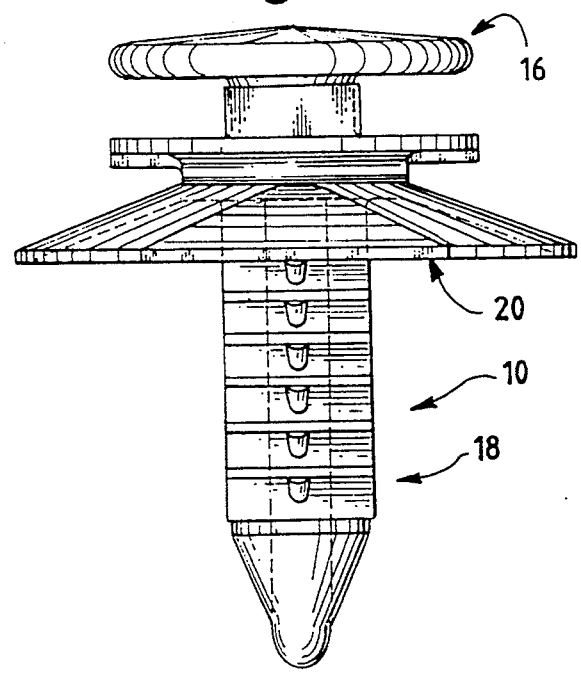
Fig. 2
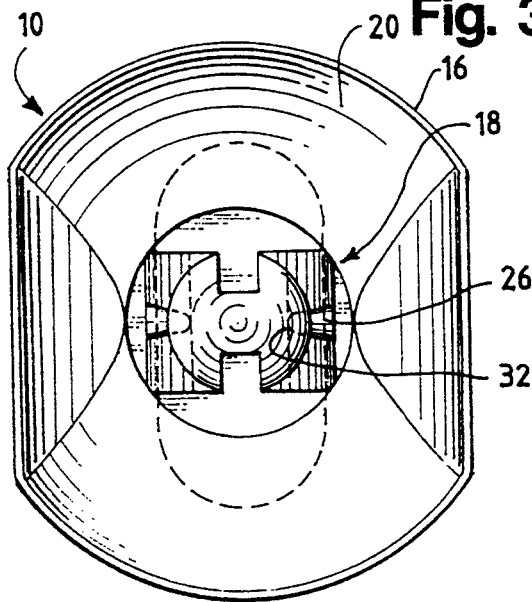
Fig. 3
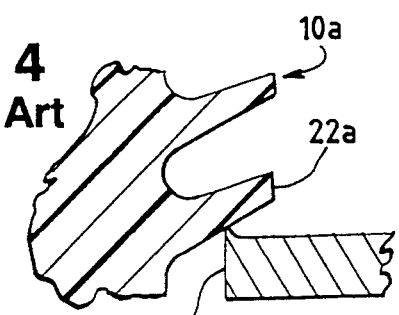
Fig. 4
Prior Art
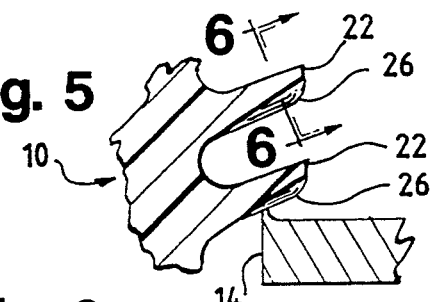
Fig. 5
Fig. 6

PUSH-IN FASTENER HAVING FINS WITH WORK-PIECE ENGAGEMENT RIBS

BACKGROUND OF THE INVENTION

1. Field of the Invention

This invention relates generally to push-in fasteners, and more particularly to a push-in fastener having at least one resilient fin formed along the shank of the fastener where the fin includes at least one engagement rib for contact with the edges of an aperture of a workpiece and for absorbing any wear or shear caused by the aperture edges during insertion and removal so that the fin substantially maintains the originally designed insertion and removal forces regardless of the number of times the fastener is inserted and removed.

2. Description of the Related Art

Push-in fasteners are typically are utilized to secure two members, together, such as two panels or the like, and include a head and a shank. The shank includes one or more resilient fins for insertion and retention of the shank within aligned apertures of the articles.

One type of push-in fastener is known as a "Christmas tree" type fastener which includes one or more sets of spaced fins formed along the length of the shank. During insertion of such fasteners within an aperture of a panel, however, the edges of the aperture can be rough and may include burrs which tend to shear material away from the surface of the fins. A reduction of fin material results in lower insertion and removal forces which can cause premature failure of the fastener, especially after repeated cycles of insertion and removal of the fastener with respect to the aperture of the panel.

It therefore would be desirable to provide a push-in fastener having a head, a shank and at least one fin formed with the shank for insertion and retention of the shank within an aperture of an article where the fin includes at least one engagement rib formed on one side thereof for absorbing any shear or wear caused by the edges of the aperture.

SUMMARY OF THE INVENTION

The invention provides a push-in fastener including a head member and a shank member integrally formed with the back side of the head member. The shank includes at least one resilient fin formed therewith for insertion and retention of the shank within an aperture of an article. The fin includes at least one engagement rib formed on one side thereof for engagement with the edges of the aperture and for absorbing any wear or shear caused by the edges so that the fin remains substantially intact and provides the designed insertion and removal forces regardless of the number of times the shank is inserted and removed from the aperture.

The shank can include one or more sets of fins, each set positioned along the length of the shank and including a desired number of fins where each fin is spaced and arranged substantially parallel to each other and includes an engagement rib thereon. Each rib preferably provides line contact between the fin and the aperture during insertion and has a teardrop shaped cross-sectional configuration.

BRIEF DESCRIPTION OF THE DRAWINGS

Various objects, features, and attendant advantages of the present invention will be better understood from the following detailed description, when considered in connection with the accompanying drawings in which like reference characters designate like or corresponding parts throughout the several views, and wherein:

FIG. 1 is a front elevational view of a push-in fastener including the engagement ribs of the invention formed on each fin;

FIG. 2 is a side elevational view of the fastener of FIG. 1;

FIG. 3 is a bottom plan view of the fastener of FIG. 1;

FIG. 4 is an enlarged cross-sectional view of two fins of a prior art fastener;

FIG. 5 is an enlarged cross-sectional view of two fins of the present invention illustrating the engagement ribs thereon; and FIG. 6 is an enlarged cross-sectional view of a fin taken along line 6—6 of FIG. 5 and in the direction indicated.

DESCRIPTION OF THE PREFERRED EMBODIMENTS

Referring to FIG. 1, the fastener of the invention is designated generally by the reference numeral 10. The fastener 10 can be utilized to connect two members, such as panels 12, through apertures 14 formed through the panels 12.

The fastener 10 is preferably integrally formed in one-piece from plastic or the like and includes a head 16 and a shank 18. The head 16 is substantially annular in configuration but can vary.

The shank 18 extends a predetermined distance away from a first back side 20 of the head 16. The particular cross-sectional configuration of the shank 18 can vary.

To releasably retain the shank 18 within the apertures 14 of the panels 12 and connect the panels 12 together, the shank 18 preferably includes one or more relatively flexible fins 22 integrally formed in one-piece with the shank 18. Preferably, the shank 18 includes one or more sets 24 of fins 22, each set 24 including a predetermined number of fins 22.

The fins 22 in each set are spaced longitudinally along the shank 18 at predetermined angles with respect to the longitudinal axis of the shank 18. Thus, upon insertion of the shank 18 within the apertures 14, the fins 22 flex toward the head 16 and successively engage the back side of the bottom panel 12 in FIG. 1 to connect the panels 12 together. To vary the insertion force, one or more design criteria can be adjusted including, for example, the material, shape, size or number of fins 22 as well as the angle of the fins 22 with respect to the shank 18, among other criteria.

Upon exerting a substantial removal force, the fastener 10 can be removed from the apertures 14 thereby disconnecting the panels 12. Due to the flexibility of the fins 22, insertion and removal of the fastener 10 can be done repeatedly.

AS FIG. 4 illustrates, during insertion and removal of a prior art fastener 10a, the fins 22a engage edges of an aperture 14a which may be rough or include burrs. Thus, as the fastener 10a is inserted, the fins 22a slide along the rough edges which shears material away from the surface of the fins 22a thereby reducing their insertion and removal forces. It is to be noted that contact between the edges and the fins 22a is provided across the entire width of the fins 22a which significantly adds to the reduction of strength of the fins 22a.

In order to reduce wear on the fins 22 of the present invention during insertion as well as removal, each fin 22 can include an engagement rib 26. As FIG. 1 illustrates, each fin 22 includes an insertion side 28 and a retraction side 30, each of which can include an engagement rib 26.

The ribs 26 engage the edges of the apertures 14 and are scraped and/or deformed by the edges during insertion and removal. Thus, the structural integrity of the fins 22 can be maintained, even after repeated insertion and removal of the fastener 10, thereby providing consistent insertion and removal forces and substantially prolonging the useful life of the fastener 10.

As FIG. 3 illustrates, the ribs 26 are preferably are in the shape of a teardrop, but can vary so long as they function as described herein. With ribs 26 positioned on the insertion side 28 of the fins 22, a pointed end 32 of the teardrop rib 26 faces the shank 18. Thus, during insertion, the pointed end 32 first engages the edges of the aperture 14 and gradually flexes the fin 22 toward the head 16.

It is to be noted that the preferred three-dimensional teardrop shape of each rib 26 provides line contact with the edges of the aperture 14 during insertion and, once seated, substantially provides point contact with the edges. Line contact significantly reduces wear and scraping of the ribs 26 providing even longer life to the fastener 10.

Similarly, if desired, teardrop shaped ribs 26 can be positioned on the retraction side 30 of each fin 22 with the pointed end 32 of each rib 26 again facing the shank 18. Thus, during removal, the ribs 26 on the retraction side 30 provide line contact with the edges of the apertures 14 to reduce wear of the fins 22 and also the ribs 26.

Modifications and variations of the present invention are possible in light of the above teachings. It is therefore to be understood that within the scope of the appended claims, the invention may be practiced otherwise than as specifically described.

What is claimed and desired to be secured by Letters Patent is:

1. A push-in fastener, comprising:
   a head member;
   a shank member integrally formed with a first back side of said head and extending a predetermined distance away from said first back side of said head;
   a plurality of resilient fins formed upon a portion of said shank and independently movable with respect to each other for releasably retaining said shank within an aperture of an article, each one of said fins including a first insertion side and a second retention side; and
   a plurality of engagement ribs respectively provided upon at least one of said first insertion and second retention sides of each one of said fins for respective in dependent movement with its respective one of said fins with respect to other ones of said fins and ribs for contacting edge portions of said aperture during insertion or removal of said fastener into or out from said aperture and for absorbing any wear or shear caused by said aperture edge portions so that said fins remain substantially intact and insertion and removal forces provided by said fins remain substantially constant even after repeated cycles of insertion and removal of said fastener with respect to said aperture.

2. The fastener as defined in claim 1 wherein said engagement ribs provide line contact with said edges portions of said aperture.

3. The fastener as defined in claim 2 wherein each one of said engagement ribs comprises a teardrop shaped rib integrally formed in one-piece with said fin, a longitudinal axis of said rib being positioned substantially parallel to a longitudinal axis of said fin.

4. The fastener as set forth in claim 3, wherein:
   a pointed end portion of said teardrop shaped rib faces toward said shank member of said fastener.

5. The fastener as defined in claim 1 including at least one set of fins formed longitudinally along said shank, said set of fins including a predetermined number of fins arranged in spaced parallel alignment with each other and extending outwardly away from said shank at a predetermined angle and distance, each fin including at least one engagement ribs.

6. The fastener as set forth in claim 5, wherein:
   said at least one set of fins comprises a pair of diametrically opposed sets of fins disposed upon opposite sides of said shank member.

7. A push-in fastener, comprising:
   a head member;
   a shank member integrally formed with a first back side of said head member and extending a predetermined distance away from said back side of said head member;
   at least one set of fins integrally formed upon said shank and independently movable with respect to each other for releasably retaining said fastener within an aperture of an article, said at least one set of fins comprising a predetermined number of fins arranged in axially spaced, parallel alignment with respect to each other and extending outwardly away from said shank for a predetermined distance and at a predetermined angle, and wherein each one of said fins includes a first insertion side and a second retention side; and
   a plurality of engagement ribs integrally formed respectively with at least one of said first insertion and second retention sides of each one of said fins for respective independent movement with its respective one of said fins with respect to other ones of said fins and ribs for contacting edge portions of said aperture during insertion or removal of said fastener into and out from said aperture and for absorbing any wear or shear caused by said edge portions of said aperture so that said fins remain substantially intact and insertion and removal forces provided by said fins remain substantially constant even after repeated cycles of insertion and removal of said fastener into and out from said aperture of said article.

8. The fastener as defined in claim 7 wherein said ribs provide line contact with said edge portions of said aperture.

9. The fastener as set forth in claim 7, wherein:
   said at least one set of fins comprises a pair of diametrically opposed sets of fins disposed upon opposite sides of said shank member.

10. The fastener as defined in claims 7 wherein each one of said ribs comprises a teardrop shaped cross-sectional configuration including a longitudinal axis positioned substantially parallel to a longitudinal axis of each fin.

11. The fastener as set forth in claim 10, wherein:
    a pointed end portion of said teardrop shaped rib faces toward said shank member of said fastener.

* * * * *